US012246199B2

(12) United States Patent
Thurk et al.

(10) Patent No.: US 12,246,199 B2
(45) Date of Patent: Mar. 11, 2025

(54) FALL PROTECTION SYSTEM

(71) Applicant: 3M INNOVATIVE PROPERTIES COMPANY, St. Paul, MN (US)

(72) Inventors: Kevin M. Thurk, Hager City, WI (US); Christopher S. McLeod, Lake Elmo, MN (US); Nathan W. Safe, Red Wing, MN (US); Stephen D. Shaver, Cottage Grove, MN (US); Jared Hines, St. Paul, MN (US); Steven McPherson, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 22 days.

(21) Appl. No.: 18/298,074

(22) Filed: Apr. 10, 2023

(65) Prior Publication Data

US 2023/0347190 A1 Nov. 2, 2023

Related U.S. Application Data

(60) Provisional application No. 63/363,857, filed on Apr. 29, 2022.

(51) Int. Cl.
*A62B 35/00* (2006.01)
*A62B 35/04* (2006.01)

(52) U.S. Cl.
CPC .......... *A62B 35/0075* (2013.01); *A62B 35/04* (2013.01)

(58) Field of Classification Search
CPC ............................ A62B 35/0075; A62B 35/04
USPC ........................................................ 248/636
See application file for complete search history.

(56) References Cited

U.S. PATENT DOCUMENTS 4,756,527 A * 7/1988 Ledbetter ........... A63B 21/4017 482/139
5,230,451 A * 7/1993 Onozawa .................. A45F 3/14 224/908
5,287,943 A 2/1994 Bell
6,533,066 B1 3/2003 O'Dell
(Continued)

FOREIGN PATENT DOCUMENTS

FR 2677258 A1 8/1993

OTHER PUBLICATIONS

3M™ DBI-SALA Rescue_Retrieval Y-Lanyard 1231470, URL <https://www.3m.com/3M/en_US/p/d/v000433773/>, 1 page.
(Continued)

*Primary Examiner* — Muhammad Ijaz
(74) *Attorney, Agent, or Firm* — Kenneth B. Wood

(57) ABSTRACT

The present disclosure provides a fall protection system. The fall protection system includes a lanyard defining a first end, a second end, and a third end. The lanyard includes a one-piece webbing including a first portion including the first end and a second portion including the second end. The second portion is continuous with the first portion at the third end. The lanyard further includes a main connected portion connecting the first portion to the second portion proximal to the third end. The fall protection system further includes a truss extending between the first portion and the second portion and connected to each of the first portion and the second portion. The truss is disposed proximal to the main connected portion, such that the main connected portion is disposed between the third end and the truss.

20 Claims, 8 Drawing Sheets

(56) References Cited

U.S. PATENT DOCUMENTS

| | | | | |
|---|---|---|---|---|
| 6,851,516 | B2 | 2/2005 | Petzl et al. | |
| 8,584,799 | B1 | 11/2013 | Dennington | |
| 11,433,263 | B1 * | 9/2022 | Bishop | G08B 21/02 |
| 2006/0169534 | A1 * | 8/2006 | Green | A63B 27/00 182/7 |
| 2012/0289382 | A1 * | 11/2012 | Haddad | A63B 21/0004 482/93 |
| 2015/0202475 | A1 * | 7/2015 | Botti | A62B 35/0025 182/3 |
| 2022/0266075 | A1 * | 8/2022 | Lepp | A62B 35/0037 |
| 2024/0100372 | A1 * | 3/2024 | Safe | A62B 35/0025 |

OTHER PUBLICATIONS

3M™ DBI-SALA Rescue_Retrieval Y-Lanyard with Spreader Bar, URL <https://www.3m.com/3M/en_US/p/d/v000431869/>, 1 page.

* cited by examiner

FALL PROTECTION SYSTEM

TECHNICAL FIELD

The present disclosure relates generally to a fall protection system, and in particular to a fall protection system including a lanyard.

BACKGROUND

Fall protection system is an important safety equipment for users operating at potentially harmful or even deadly heights. For example, to help ensure safety in a fall event, users often wear safety harnesses connected to support structures with the fall protection system, including lanyards, energy absorbers, self-retracting lifelines (SRLs), descenders, and the like. When a user is connected to the support structure, the user may be referred to as being "tied off" or "anchored." To maintain a safe working condition when working at heights, the user may always maintain at least one connection to the support structure.

Fall protection systems may include a variety of components for connecting the user to the support structure (also referred to as an anchorage). For example, snap hooks or carabiners may have moveable gates that allow the user to connect to and disconnect from the support structure. In another example, a ladder safety sleeve may have a moveable gate that allows the user to connect to and disconnect from a climbing ladder fall arrest system carrier, e.g., a flexible cable or a rigid rail support structure. Conventional fall protection systems include a shock absorber and a lanyard. In an example, the lanyard may include multiple leg portions that may be connected to the shock absorber by a twisted looped design. In another example, the lanyard may include multiple leg portions, such that each leg portion may be connected to the shock absorber using a hardware, such as a ring. In case of a fall event of the user, it may be desirable that the fall protection system is able to withstand high forces. However, a strength of conventional lanyards may be limited by a strength of the hardware that is used in such fall protection systems. Moreover, the twisted loops in conventional lanyards may have a complex design and may be time-consuming to manufacture. Therefore, there is a need for a fall protection system that may be easy to manufacture in a time-efficient manner. Further, there is a need for a fall protection system that reduces a dependence on hardware.

SUMMARY

In a first aspect, the present disclosure provides a fall protection system. The fall protection system includes a lanyard defining a first end, a second end, and a third end. The lanyard includes a one-piece webbing including a first portion including the first end and a second portion including the second end. The second portion is continuous with the first portion at the third end. The lanyard further includes a main connected portion connecting the first portion to the second portion proximal to the third end. The fall protection system further includes a truss extending between the first portion and the second portion and connected to each of the first portion and the second portion. The truss is disposed proximal to the main connected portion, such that the main connected portion is disposed between the third end and the truss.

In a second aspect, the present disclosure provides a fall protection system. The fall protection system includes a lanyard defining a first end, a second end, and a third end. The lanyard includes a one-piece webbing including a first portion including the first end and a second portion including the second end. The second portion is continuous with the first portion at the third end. The fall protection system further includes a truss extending between the first portion and the second portion and connected to each of the first portion and the second portion. The truss is disposed proximal to the third end. The fall protection system further includes an energy absorber connected to the lanyard at the third end. The energy absorber is configured to deploy in response to a threshold absorbing force applied on the energy absorber.

In a third aspect, the present disclosure provides a fall protection system. The fall protection system includes a lanyard defining a first end, a second end, and a third end. The lanyard includes a one-piece webbing including a first portion including the first end and a second portion including the second end. The second portion is continuous with the first portion at the third end. The fall protection system further includes a truss connecting the first portion to the second portion proximal to the third end. The truss is disposed proximal to the third end. The truss is configured to maintain a structural integrity of the lanyard proximal to the third end in an event of a fall.

The details of one or more examples of the disclosure are set forth in the accompanying drawings and the description below. Other features, objects, and advantages of the disclosure will be apparent from the description and drawings, and from the claims.

BRIEF DESCRIPTION OF THE DRAWINGS

Exemplary embodiments disclosed herein may be more completely understood in consideration of the following detailed description in connection with the following figures. The figures are not necessarily drawn to scale. Like numbers used in the figures refer to like components. However, it will be understood that the use of a number to refer to a component in a given figure is not intended to limit the component in another figure labeled with the same number.

DETAILED DESCRIPTION

Figure 1:
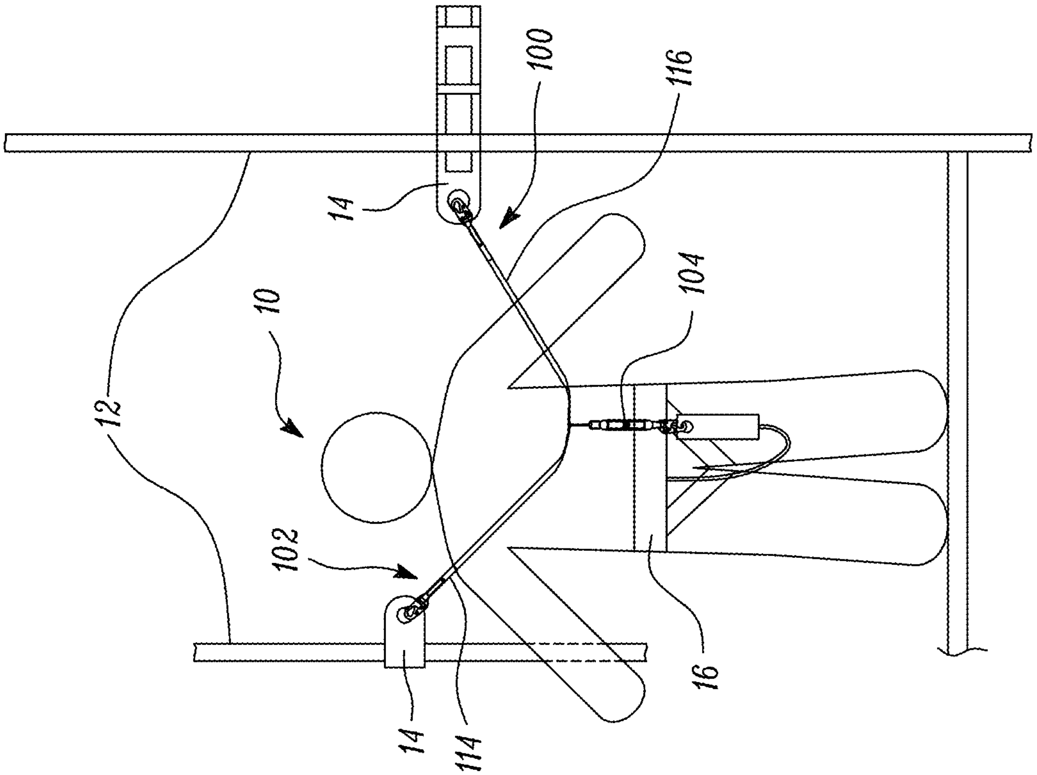
FIG. 1 is a schematic view of a user wearing a fall protection system, according to an embodiment of the present disclosure.

In the following description, reference is made to the accompanying figures that form a part thereof and in which various embodiments are shown by way of illustration. It is to be understood that other embodiments are contemplated and may be made without departing from the scope or spirit of the present disclosure. The following detailed description, therefore, is not to be taken in a limiting sense.

In the following disclosure, the following definitions are adopted.

As used herein, all numbers should be considered modified by the term "about". As used herein, "a," "an," "the," "at least one," and "one or more" are used interchangeably.

The term "about", unless otherwise specifically defined, means to a high degree of approximation (e.g., within +/−5% for quantifiable properties) but again without requiring absolute precision or a perfect match.

As used herein as a modifier to a property or attribute, the term "generally", unless otherwise specifically defined, means that the property or attribute would be readily recognizable by a person of ordinary skill but without requiring absolute precision or a perfect match (e.g., within +/−20% for quantifiable properties).

As used herein, "at least one of A and B" should be understood to mean "only A, only B, or both A and B".

The term "mechanically coupled", "coupled", or "connected" may include direct physical connections between two or more components, or indirect physical connections between two or more components that are connected together by one or more additional components. For example, a first component may be coupled to a second component by being directly connected together or by being connected by a third component.

As used herein, the term "fall protection system" may include any type of fall protection/arrest equipment that is used to connect a user to a support structure for the purpose of securing the user to the support structure in an event of a fall. The fall protection system may include a variety of carabiners (also referred to as "spring hooks" or "snap hooks"), shackles, carrier sleeves, or other devices capable of connecting the user to and disconnecting the user from the support structure.

The present disclosure relates to a fall protection system. The fall protection system of the present disclosure is particularly used to ensure safety in an event of a fall of a user working at potentially dangerous heights.

Conventional fall protection systems include a shock absorber and a lanyard. In an example, the lanyard may include multiple leg portions that may be connected to the shock absorber by a twisted looped design. In another example, the lanyard may include multiple leg portions, such that each leg portion may be connected to the shock absorber by a hardware, such as a ring. In case of the fall event of the user, it may be desirable that the fall protection system is able to withstand high forces. However, a strength of conventional lanyards may be limited by a strength of the hardware that may be used in such fall protection systems. Moreover, the twisted loops in conventional lanyards may have a complex design and may be time-consuming to manufacture.

Therefore, there exists a need for a fall protection system that may withstand high forces without failure thereof as well as reduce a dependency on hardware. There is also a need for a fall protection system that may be easy to manufacture in a time-efficient manner.

The present disclosure provides a fall protection system. The fall protection system includes a lanyard defining a first end, a second end, and a third end. The lanyard includes a one-piece webbing including a first portion including the first end and a second portion including the second end. The second portion is continuous with the first portion at the third end. The lanyard further includes a main connected portion connecting the first portion to the second portion proximal to the third end. The fall protection system further includes a truss extending between the first portion and the second portion and connected to each of the first portion and the second portion. The truss is disposed proximal to the main connected portion, such that the main connected portion is disposed between the third end and the truss.

The fall protection system as described herein may withstand higher forces, for example, up to about 7000 pounds without failure during usage. The lanyard of the fall protection system includes the one-piece webbing instead of multiple (or separate) webbings. Further, the lanyard may have a robust design and may be cost-effective as compared to conventional lanyards. The main connection portion may be stitched to the first portion and the second portion. The one-piece webbing as described herein may also improve aesthetics of various stitch patterns associated with the lanyard, such as, the main connection portion. Further, the lanyard is coupled to an energy absorber of the fall protection system by a strap and a connecting loop. Thus, the lanyard or the arrangement that couples the lanyard to the energy absorber does not include any hardware or metal components, such as rings, thereby eliminating strength restrictions as presented by such hardware. Moreover, the lanyard of the fall protection system may be easy to manufacture and the lanyard may be manufactured in lesser time as compared to conventional lanyards.

Further, the fall protection system includes the truss that increases a strength of the lanyard. More particularly, the truss may be designed to have a high failure point, so that the truss may maintain a structural integrity of the lanyard proximal to the third end of the lanyard. The truss also prevents a failure of the main connected portion during fall events. Further, a force at which the energy absorber may deploy is lesser than a maximum force that the truss can withstand.

Referring now to Figures, FIG. 1 illustrates a user 10 wearing a fall protection system 100. The fall protection system 100 includes a lanyard 102. The lanyard 102 is removably coupled to a support structure 12. The support structure 12 may include an anchorage, a lifeline, a beam, or any suitable structure capable of supporting a weight of the user 10 in an event of a fall of the user 10. In some examples, the lanyard 102 may be coupled to the support structure 12 via a coupling device 14. The coupling device 14 may include any known anchor devices, sleeves, connectors, or other conventional connection devices. Further, the fall protection system 100 includes an energy absorber 104. The energy absorber 104 is removably coupled to a device 16 worn by the user 10. The device 16 may include, for example, a safety harness.

Figure 2:
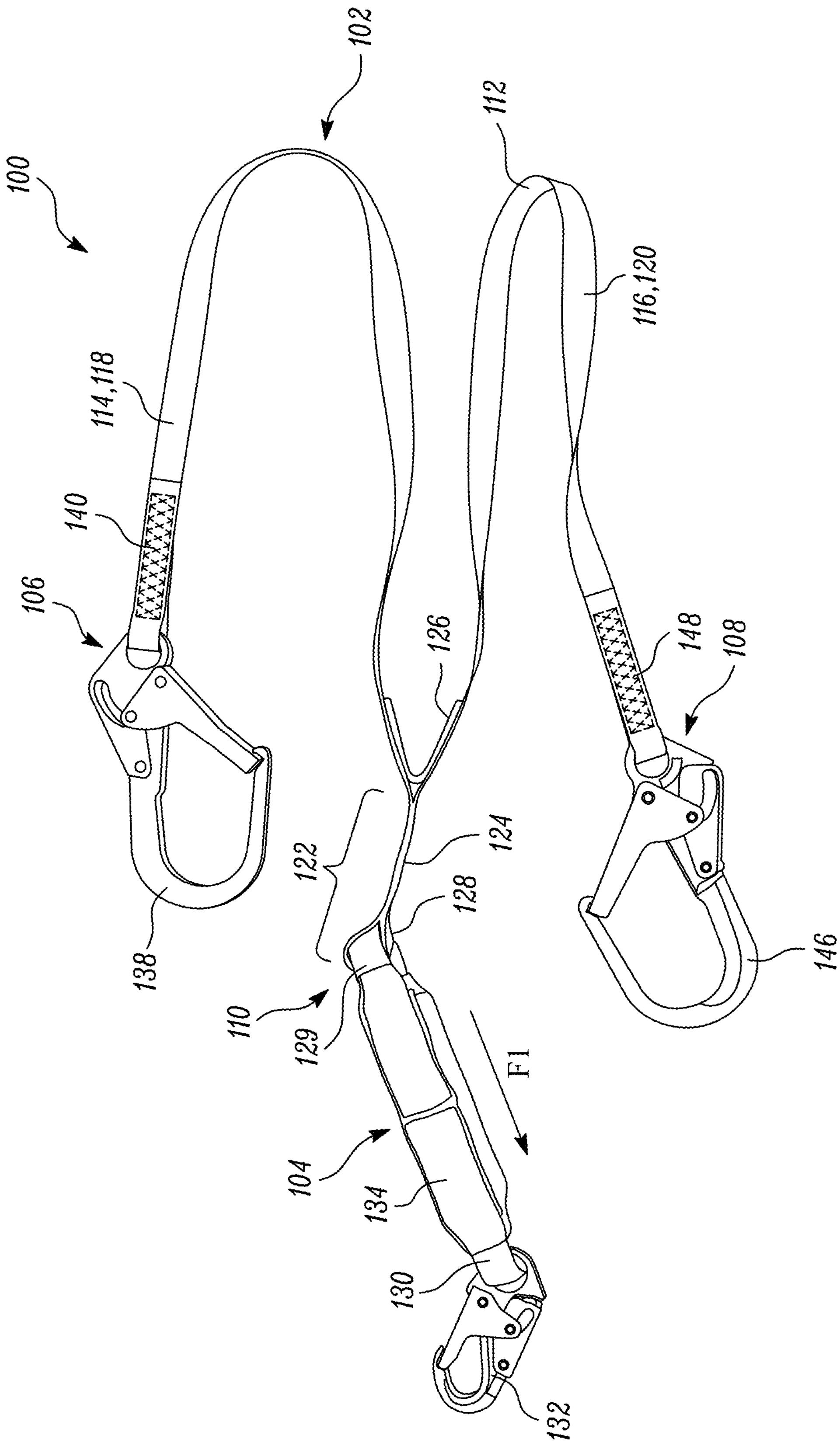
FIG. 2 is a perspective view of the fall protection system of FIG. 1, according to an embodiment of the present disclosure.

Referring now to FIG. 2, a perspective view of the fall protection system 100 is illustrated. The fall protection system 100 includes the lanyard 102 defining a first end 106, a second end 108, and a third end 110. The lanyard 102 includes a one-piece webbing 112. In other words, a single-continuous piece of webbing is used to form the first, second, and third ends 106, 108, 110 of the lanyard 102. In some embodiments, the one-piece webbing 112 includes polyester. In other embodiments, the lanyard 102 may include a one-piece wire rope or a one-piece synthetic rope instead of the one-piece webbing 112. It should be noted that the present disclosure is not limited by a material of the one-piece webbing 112.

The one-piece webbing 112 includes a first portion 114 including the first end 106 and a second portion 116 including the second end 108. The second portion 116 is continuous with the first portion 114 at the third end 110. More particularly, the first portion 114 transitions into the second portion 116 at the third end 110. Thus, the lanyard 102 is embodied as a two-legged lanyard formed by the one-piece webbing 112 and disposed in a Y-configuration. A section of the first and second portions 114, 116 define corresponding legs 118, 120 of the lanyard 102. Further, a stem portion 122 of the lanyard 102 includes the third end 110. Since the lanyard 102 of the fall protection system 100 includes the one-piece webbing 112 instead of multiple separate webbings, the lanyard 102 eliminates twisted loops or hardware for connecting separate webbings as in conventional lanyards. Further, the lanyard 102 may have a robust design and may be cost-effective as compared to conventional lanyards. Moreover, the lanyard 102 of the fall protection system 100 may be easy to manufacture and the lanyard 102 may be manufactured in lesser time as compared to conventional lanyards.

The lanyard 102 further includes a main connected portion 124 connecting the first portion 114 to the second portion 116 proximal to the third end 110. More particularly, the one-piece webbing 112 is looped proximal to the third end 110, such that the first and second portions 114, 116 overlap at the stem portion 122. Further, the first and second portions 114, 116 are connected at the main connected portion 124 to define the stem portion 122 of the lanyard 102. The fall protection system 100 also includes a truss 126 disposed proximal to the third end 110. The truss 126 extends between the first portion 114 and the second portion 116 and is connected to each of the first portion 114 and the second portion 116. The truss 126 connects the first portion 114 to the second portion 116 proximal to the third end 110. Specifically, the truss 126 indirectly connects the first portion 114 to the second portion 116. Further, the truss 126 is disposed proximal to the main connected portion 124, such that the main connected portion 124 is disposed between the third end 110 and the truss 126. In other words, the truss 126 is disposed at a junction of the legs 118, 120 and the stem portion 122 of the lanyard 102. In some embodiments, the truss 126 includes polyester. It should be noted that the present disclosure is not limited by a material of the truss 126 and the truss 126 may be made of any other material. In the illustrated embodiment of FIG. 2, the material of the one-piece webbing 112 is similar to the material of the truss 126. However, in other embodiments, the material of the one-piece webbing 112 may be different from the material of the truss 126.

Figure 3:
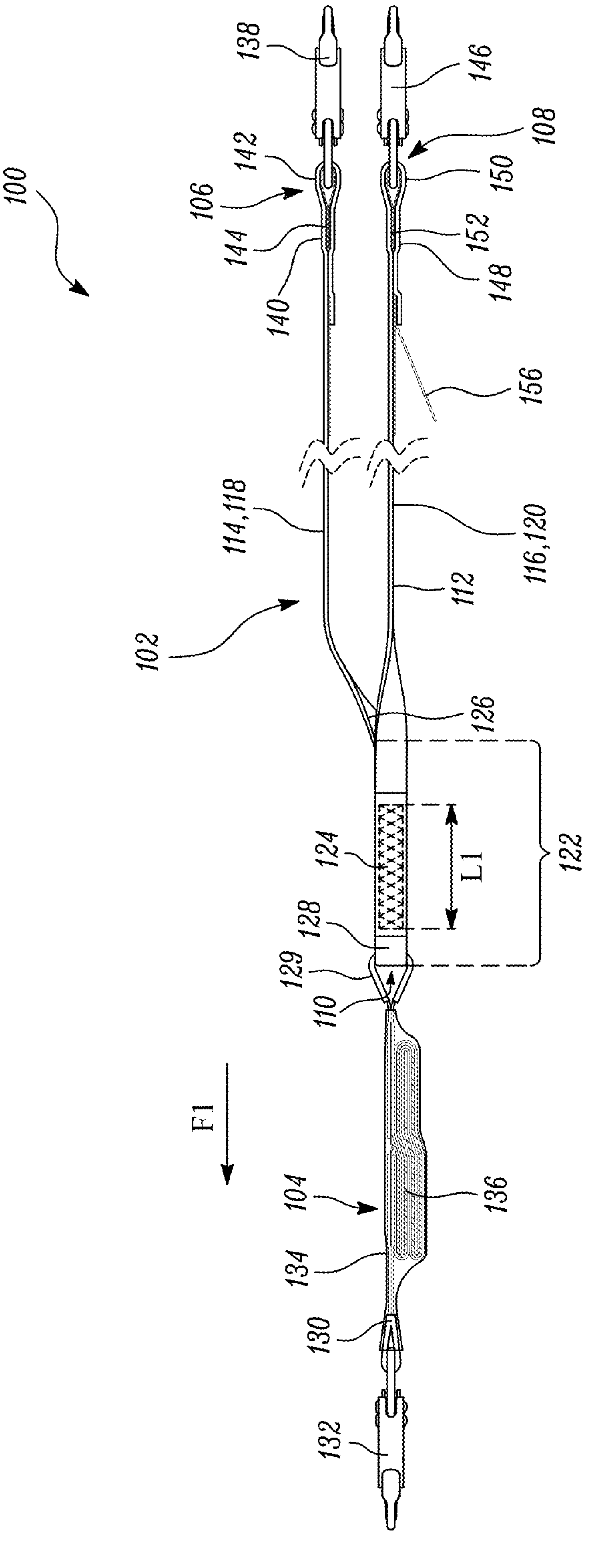
FIG. 3 is a partial sectional side view of the fall protection system of FIG. 2, according to an embodiment of the present disclosure.

Referring to FIG. 3, the fall protection system 100 further includes the energy absorber 104 connected to the lanyard 102 at the third end 110. In some embodiments, the energy absorber 104 is configured to deploy in response to a threshold absorbing force F1 applied on the energy absorber 104. Further, upon deployment of the energy absorber 104, the fall protection system 100 is configured to provide a free fall distance of greater than 2 feet. It should be noted that the energy absorber 104 may deploy even when only one of the first and second portions 114, 116 are connected to the support structure 12 (see FIG. 1).

Further, the first portion 114 and the second portion 116 together form a connecting loop 128 at the third end 110. The connecting loop 128 is disposed adjacent to the main connected portion 124 and connected to the energy absorber 104. Specifically, the fall protection system 100 includes a first strap 129 and a second strap 130. In the illustrated embodiment of FIG. 3, the first and second straps 129, 130 are made of polyester. In other embodiments, the first and second straps 129, 130 may be made of any other material. The first and second straps 129, 130 are connected to the energy absorber 104. The connecting loop 128 and the first strap 129 connect the lanyard 102 to the energy absorber 104. Further, the second strap 130 connects the energy absorber 104 to a snap hook 132. The snap hook 132 may be removably connected to the device 16 (see FIG. 1). Thus, a coupling arrangement of the lanyard 102 with the energy absorber 104 does not include any hardware or metal components, such as rings, thereby eliminating strength restrictions as presented by such hardware.

Further, the energy absorber 104 includes a tubing 134 and a web member 136. The web member 136 is received within the tubing 134. The web member 136 is disposed in a looped manner within the tubing 134. In some embodiments, the web member 136 may be made of a polyester. In other embodiments, the web member 136 may be made of any other material. It should be noted that a design of the energy absorber 104 as described herein in exemplary in nature, and the energy absorber 104 may include any other design or combination of components, without any limitations. Further, in some embodiments, the fall protection system 100 may omit the energy absorber 104. In such embodiments, the snap hook 132 may be directly connected to the connecting loop 128.

Further, as shown in FIG. 3, the main connected portion 124 is disposed between the connecting loop 128 and the truss 126. In the illustrated embodiment of FIG. 3, the main connected portion 124 is stitched to the first portion 114 and the second portion 116 proximal to the third end 110. In some embodiments, a stitch pattern of the main connected portion 124 includes a diamond stitch pattern surrounded by a rectangular stitch pattern. However, the main connected portion 124 may include any other type of stitch pattern, without any limitations. In other embodiments, it may be contemplated that the main connected portion 124 may be connected to the first and second portions 114, 116 by any other joining means, for example, adhesives, mechanical fasteners, and the like. In some embodiments, the main connected portion 124 has a length L1 from 2 inches to 10 inches.

Figure 4:
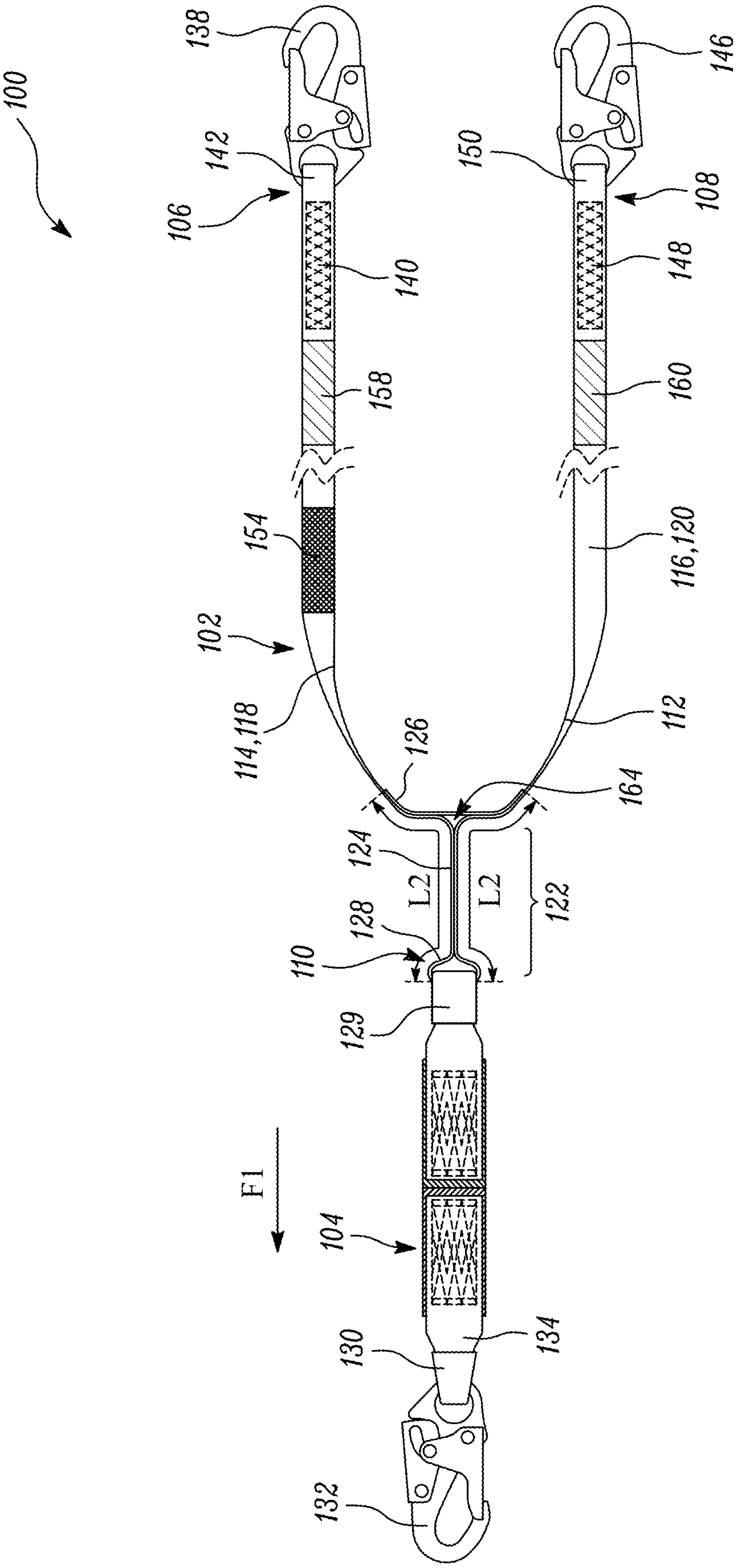
FIG. 4 is a schematic top view of the fall protection system of FIG. 2, according to an embodiment of the present disclosure.

Referring now to FIG. 4, a length L2 may be defined between the connecting loop 128 and a location wherein the truss 126 terminates at each of the first and second portions 114, 116. In some embodiments, the length L2 may be from 6 inches to 14 inches. Referring to FIGS. 3 and 4, the fall protection system 100 further includes a first snap hook 138 connected to the first portion 114 of the lanyard 102 at the first end 106. In some embodiments, the first portion 114 includes a first connected portion 140 forming a first loop 142 at the first end 106. The first loop 142 is connected to the first snap hook 138. Further, the lanyard 102 includes a first liner 144 connected to the first connected portion 140 and engaging with the first snap hook 138. In the illustrated embodiment of FIGS. 3 and 4, the first connected portion 140 is stitched to the first liner 144. However, any other joining technique may be used to connect the first connected portion 140 to the first liner 144.

For forming the first loop 142, the first liner 144 is placed along a section of the first portion 114. Further, the first portion 114 and the first liner 144 are looped through the first snap hook 138 and the stitching is performed for forming the first loop 142. Thus, the first connected portion 140 causes the first liner 144 to be disposed/sandwiched between adjacent sections of the first portion 114. In some embodiments, the first liner 144 includes nylon. In other embodiments, the first liner 144 may be made of any other material. Further, a stitch pattern of the first connected portion 140 includes a diamond stitch pattern surrounded by a rectangular stitch pattern. However, the first connected portion 140 may include any other type of stitch pattern, without any limitations. In other embodiments, it may be contemplated that the first connected portion 140 may be connected to the first liner 144 by any other joining means, for example, adhesives, mechanical fasteners, and the like.

The fall protection system 100 includes a second snap hook 146 connected to the second portion 116 of the lanyard 102 at the second end 108. A particular example of the snap hooks 132, 138, 146 that may be adapted to incorporate certain techniques of this disclosure is the Saflok™ Snap Hook manufactured by 3M Fall Protection Business. In other example, the snap hooks 132, 138, 146 may be replaced by a carrier sleeve. A particular example of a carrier sleeve that may be adapted to incorporate certain techniques of this disclosure is the Lad-Saf™ X3 Detachable Carrier Sleeve manufactured by 3M Fall Protection Business.

In some embodiments, the second portion 116 includes a second connected portion 148 forming a second loop 150 at the second end 108. The second loop 150 is connected to the second snap hook 146. Further, the lanyard 102 includes a second liner 152 connected to the second connected portion 148 and engaging with the second snap hook 146. In the illustrated embodiment of FIGS. 3 and 4, the second connected portion 148 is stitched to the second liner 152. However, any other joining technique may be used to connect the second connected portion 148 to the second liner 152.

For forming the second loop 150, the second liner 152 is placed along a section of the second portion 116. Further, the second portion 116 and the second liner 152 are looped around the second snap hook 146 and the stitching is performed for forming the second loop 150. Thus, the second connected portion 148 causes the second liner 152 to be disposed/sandwiched between adjacent sections of the second portion 116. In some embodiments, the second liner 152 includes nylon. In other embodiments, the second liner 152 may be made of any other material. Further, a stitch pattern of the second connected portion 148 includes a diamond stitch pattern surrounded by a rectangular stitch pattern. However, the second connected portion 148 may include any other type of stitch pattern, without any limitations. In other embodiments, it may be contemplated that the second connected portion 148 may be connected to the second liner 152 by any other joining means.

In some embodiments, the stitch pattern on each of the main connected portion 124, the first connected portion 140, and the second connected portion 148 may be the same. Such an approach may reduce cycle time as the same set-up may be used for incorporating the stitch pattern on each of the main connected portion 124, the first connected portion 140, and the second connected portion 148. Further, the lanyard 102 may include a heat transfer logo 154, a label 156 (see FIG. 3), and labels 158, 160. The heat transfer logo 154 and the labels 156, 158, 160 may include various warnings, manufacturing details, or any other information for the fall protection system 100.

Figure 5:
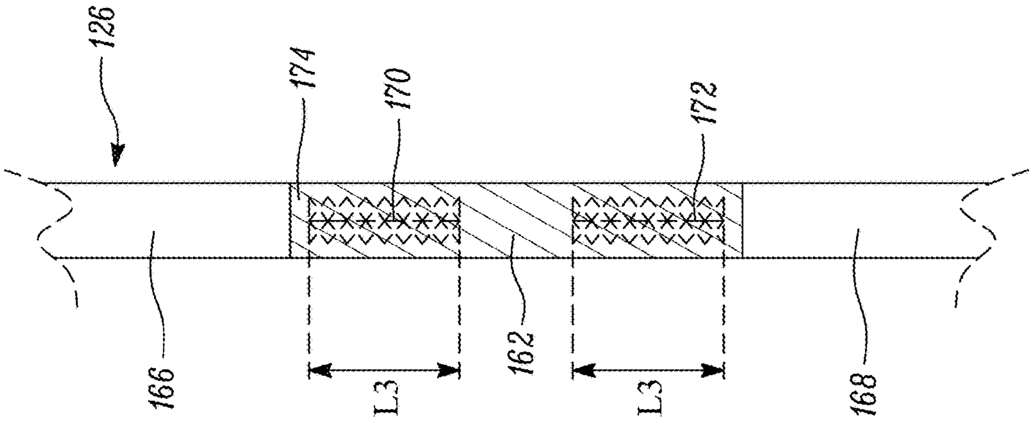
FIG. 5 is a schematic front view of a truss of the fall protection system of FIG. 2, according to an embodiment of the present disclosure.

Referring now to FIGS. 4 and 5, the truss 126 includes a middle portion 162 partially connected to each of the first portion 114 and the second portion 116, such that a gap 164 is defined between the first portion 114, the second portion 116, and the middle portion 162. The gap 164 is disposed adjacent to the main connected portion 124. The first portion 114, the second portion 116, and the truss 126 are detached from each other at the gap 164.

FIG. 5 illustrates a schematic front view of the truss 126. As shown in FIG. 5, the truss 126 includes a first end portion 166 extending from the middle portion 162. The first end portion 166 is connected to the first portion 114 (see FIG. 4) of the lanyard 102 (see FIG. 4). The truss 126 further includes a second end portion 168 extending from the middle portion 162 opposite to the first end portion 166. The second end portion 168 is connected to the second portion 116 (see FIG. 4) of the lanyard 102.

The lanyard 102 further includes a first truss connected portion 170 connecting the truss 126 to the first portion 114. More particularly, the first truss connected portion 170 connects the first end portion 166 of the truss 126 to the first portion 114. In the illustrated embodiment of FIG. 5, the first truss connected portion 170 is stitched to the truss 126 and the first portion 114. In other embodiments, it may be contemplated that the first truss connected portion 170 may connect the truss 126 to the first portion 114 by any other joining means, for example, adhesives, mechanical fasteners, and the like.

The lanyard 102 further includes a second truss connected portion 172 connecting the truss 126 to the second portion 116. More particularly, the second truss connected portion 172 connects the second end portion 168 of the truss 126 to the second portion 116. The second truss connected portion 172 is substantially similar to the first truss connected portion 170. In the illustrated embodiment of FIG. 5, the second truss connected portion 172 is stitched to the truss 126 and the second portion 116. In other embodiments, it may be contemplated that the second truss connected portion 172 may connect the truss 126 to the second portion 116 by any other joining means.

Further, a stitch pattern of the first and second truss connected portions 170, 172 includes a diamond stitch pattern. However, the first and second truss connected portions 170, 172 may include any other type of stitch pattern, without any limitations. Further, in some embodiments, each of the first truss connected portion 170 and the second truss connected portion 172 may have a length L3 from 3 inches to 6 inches. It should be noted that the truss 126 may be connected to the first and second portions 114, 116 using any other joining technique instead of stitching. For example, the truss 126 may be connected to the first and second portions 114, 116 by ferrule connectors, adhesives, interweaving techniques, and the like. In some embodiments, a label 174 may be coupled to the truss 126. The label 174 may include manufacturing details or warnings for the truss 126. The first and second truss connected portions 170, 172 may connect the label 174 with the truss 126.

Referring again to FIG. 4, the truss 126 is configured to maintain a structural integrity of the lanyard 102 proximal to the third end 110 in the event of the fall. In an example, wherein only one of the first and second snap hooks 138, 146 is connected to the support structure 12 (see FIG. 1) and a fall event occurs, the truss 126 ensures that the structural integrity of the lanyard 102 proximal to the third end 110 is maintained. The truss 126 also ensures that the structural integrity of the main connected portion 124 is maintained so that the main connected portion 124 does not fail during the fall event. For example, the truss 126 ensures that the main connected portion 124 does not tear away when the lanyard 102 is being subjected to shear forces. Thus, the truss 126 may be designed to withstand high forces, so that the truss 126, and eventually the main connected portion 124, does not break away from the first and second portions 114, 116. In some embodiments, the truss 126 may prevent a failure of the main connected portion 124 prior to a deployment of the energy absorber 104. Thus, the threshold absorber force F1 at which the energy absorber 104 deploys may be substantially lesser than a maximum force that the truss 126 can withstand. In some embodiments, the truss 126 may be designed to withstand forces of up to 2500 pounds, without any limitations.

Further, the truss 126 may also maintain the structural integrity of the fall protection system 100 in an event of a misuse or incorrect usage of the fall protection system 100. An exemplary misuse situation may be observed when the user 10 (see FIG. 1) attaches the first snap hook 138 to the support structure 12 and the second snap hook 146 to the device 16 (see FIG. 1) instead of the support structure 12. Thus, the fall protection system 100 as described herein may ensure fall arrest of the user 10 in situations where the fall protection system 100 may be incorrectly connected to the support structure 12 or when the fall event occurs while the user 10 is disconnecting or reconnecting one of the snap hooks 138, 146.

Further, the one-piece webbing 112 as described herein may also improve aesthetics of the stitch patterns of the main connection portion 124, the first and second connection portions 142, 150, and the first and second truss connection portions 170, 172. Furthermore, the one-piece webbing 112 may be designed to withstand two different amounts of maximum forces. In one example, the one-piece webbing 112 may be designed to withstand a force F2 in a range of 5000 pounds to 8000 pounds. In another example, the one-piece webbing 112 may be designed to withstand a force F3 in a range of 8500 pounds to 10000 pounds. The dimensions of the one-piece webbing 112 that may withstand the force F2 may be different from the dimensions of the one-piece webbing 112 that may withstand the force F3. For example, a thickness of the one-piece webbing 112 that may withstand the force F3 may be greater than the thickness of the one-piece webbing 112 that may withstand the force F2. Moreover, the fall protection system 100 as described herein may withstand higher forces during fall events, for example, up to about 7000 pounds, without failure thereof. However, a maximum force that the fall protection system 100 may withstand may vary based on, for example, the dimensions of the one-piece webbing 112, the main connected portion 124, the first and second connected portions 140, 148, and/or the truss 126.

Figure 6A:
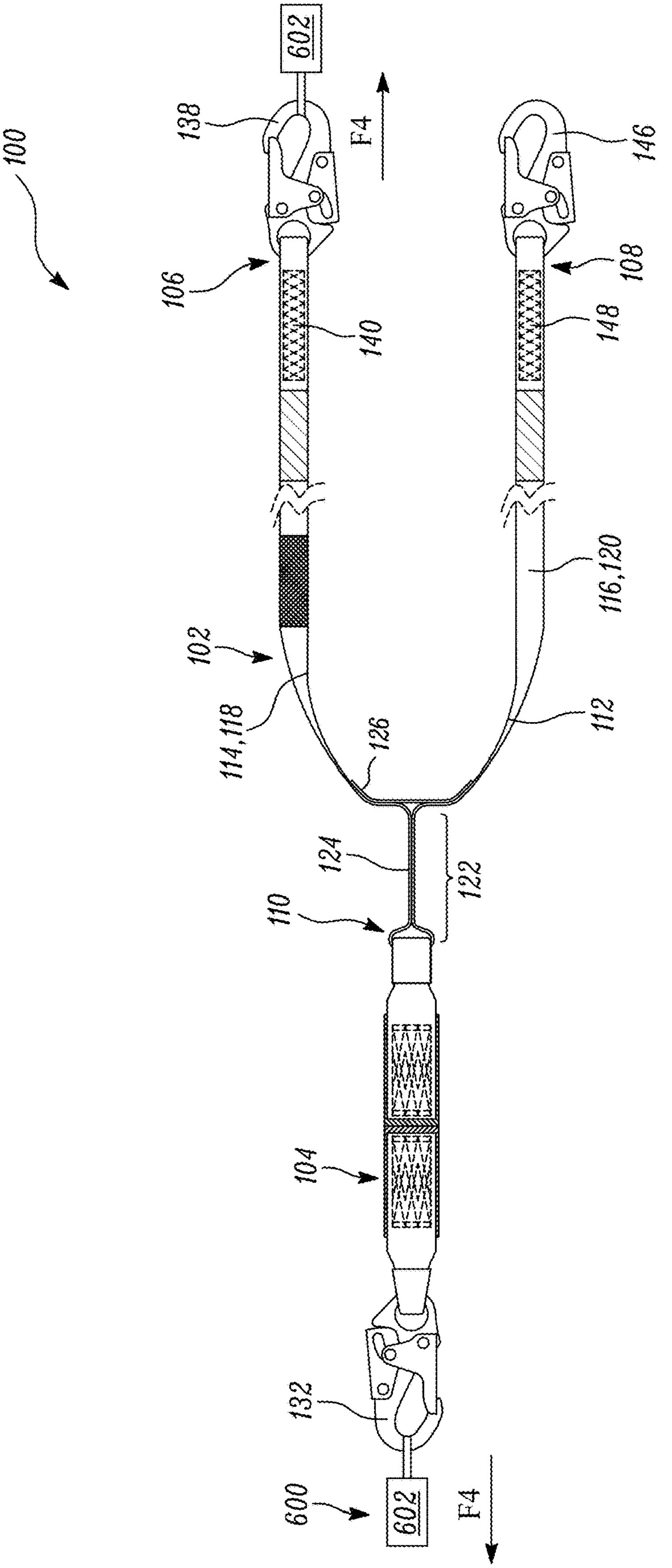
FIGS. 6A, 6B, and 6C illustrate a test setup for evaluating the fall protection system of FIG. 2 in different testing configurations, according to an embodiment of the present disclosure.
Figure 6B:
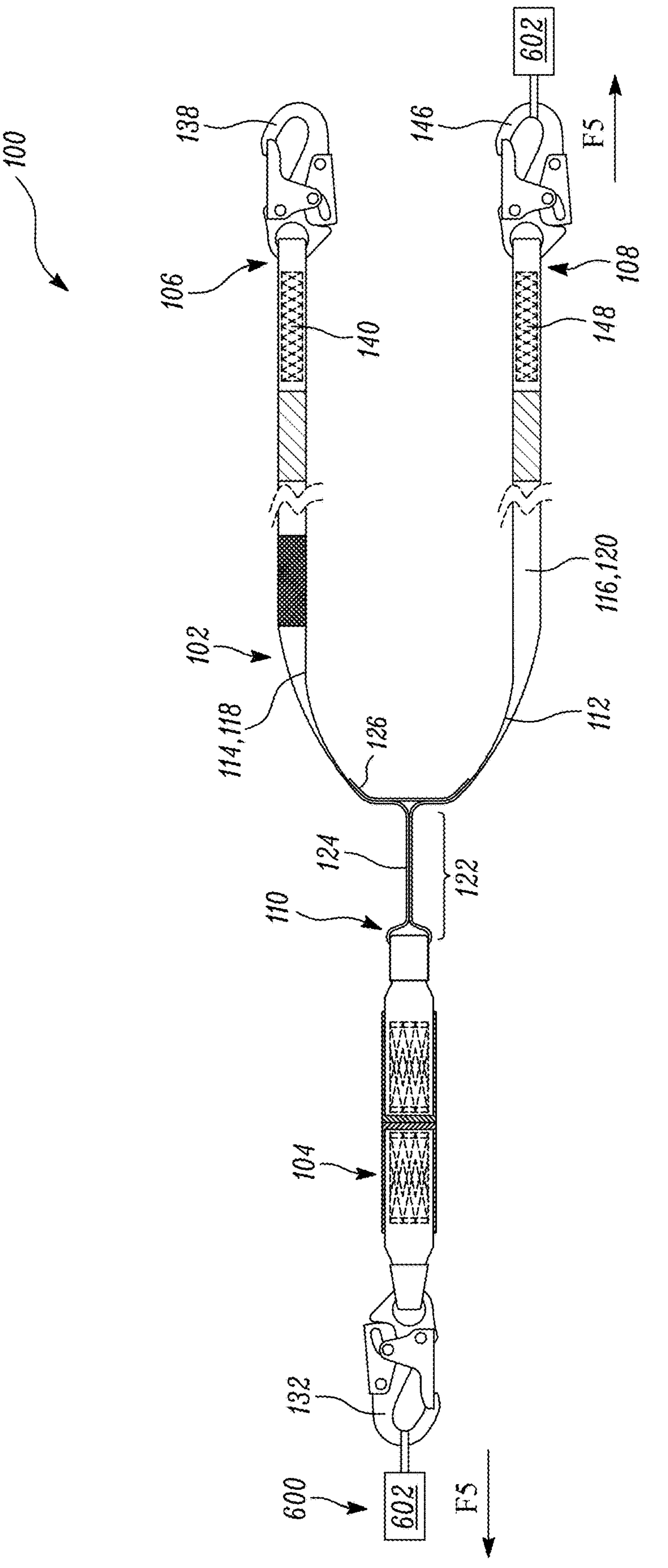
Figure 6C:
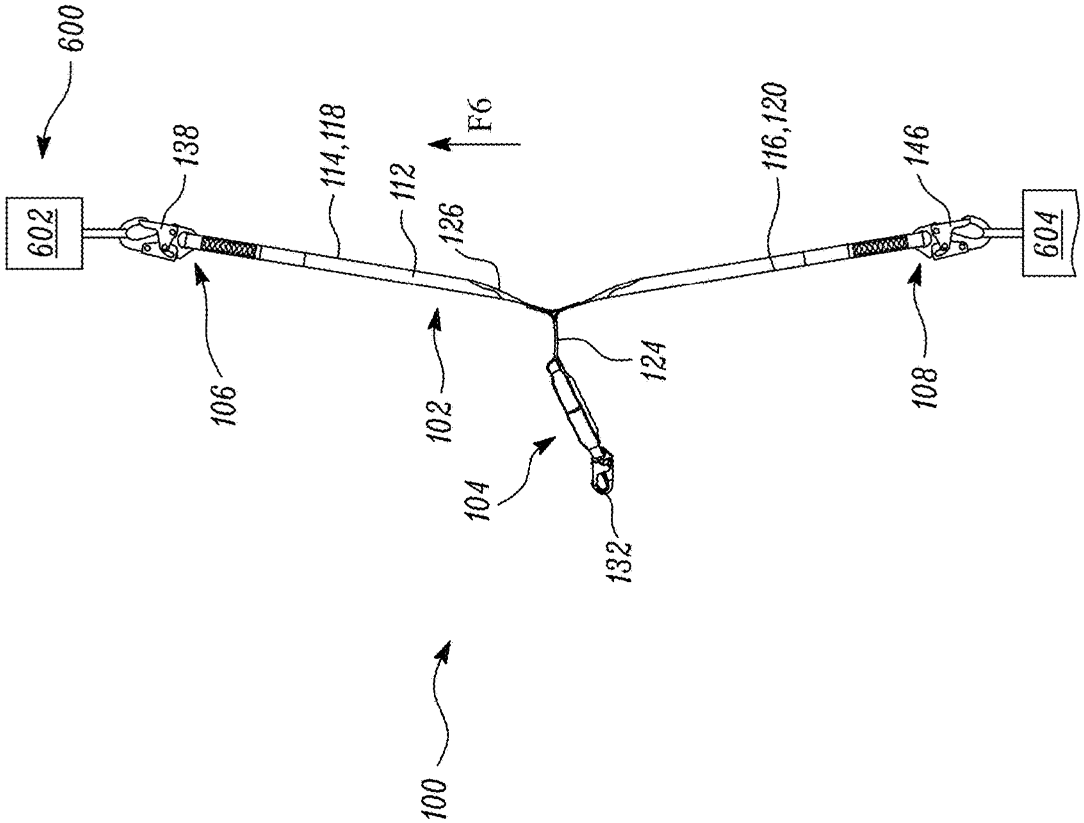

Referring now to FIGS. 6A, 6B, and 6C, an exemplary test setup 600 for evaluating the fall protection system 100 in different testing configurations is illustrated. The test setup 600 may be employed for a static test or a dynamic test on the fall protection system 100. The static test refers to a suspended test for a predefined time period. The dynamic test refers to a freefall test from a predefined height. The test setup 600 was used to evaluate the fall protection system 100 under three different testing configurations.

Referring to FIG. 6A, for the first testing configuration, a first specimen of the fall protection system 100 was used. Further, the snap hook 132 and the first snap hook 138 of the fall protection system 100 were connected to a tensile test equipment 602. The tensile test equipment 602 was used to apply a force F4 at each of the snap hook 132 and the first snap hook 138 to evaluate a static strength of the first specimen. The force F4 was applied for a period of at least one minute. Further, the time to reach the force F4 was greater than three minutes. As such, the force F4 was applied in order to replicate the fall of the user 10 (see FIG. 1). The force F4 was greater than 5000 pounds. During the first testing configuration, it was observed that the fall protection system 100 can withstand the force F4 of at least 5000 pounds. From the first testing configuration, it was concluded that the fall protection system 100 can arrest the fall of the user 10 without failing.

As shown in FIG. 6B, for a second testing configuration, a second specimen of the fall protection system 100 was used. Further, the snap hook 132 and the second snap hook 146 of the fall protection system 100 were connected to the tensile test equipment 602. The tensile test equipment 602 was used to apply a force F5 at each of the snap hook 132 and the second snap hook 146 to evaluate the static strength of the second specimen. The force F5 was applied for a period of at least one minute. Further, the time to reach the force F5 was greater than three minutes. As such, the force F5 was applied in order to replicate the fall of the user 10 (see FIG. 1). The force F5 was greater than 5000 pounds. During the second testing configuration, it was observed that the fall protection system 100 can withstand the force F5 of at least 5000 pounds. From the second testing configuration, it was concluded that the fall protection system 100 can arrest the fall of the user 10 without failing.

As shown in FIG. 6C, for a third testing configuration, a third specimen of the fall protection system 100 was used. Further, the first snap hook 138 and the second snap hook 146 of the fall protection system 100 were connected to the tensile test equipment 602. The third testing configuration includes a leg-to-leg test. Further, the tensile test equipment 602 was used to apply a force F6 at the first snap hook 138 and the second snap hook 146 was anchored to evaluate the static strength of the third specimen. In another example, the force F6 may be applied at the second snap hook 146 and the first snap hook 138 may be anchored to a fixed structure 604. The force F6 was applied for a period of at least one minute. Further, the time to reach the force F6 was greater than three minutes. The force F6 was greater than 5000 pounds.

During the third testing configuration, it was also observed that the truss 126 breaks away from the first and second portions 114, 116 when the truss 126 was subjected to the maximum force that the truss 126 was designed to withstand. Further, continued application of the force F6 after failure of the truss 126 lead to a failure of the main connected portion 124. Moreover, based on the failure of the main connected portion 124, the lanyard 102 formed a linear strip of webbing that was able to withstand over 5000 pounds of force without failing. Thus, during the third testing configuration, it was observed that the fall protection system 100 can withstand the force F6 of at least 5000 pounds. From the third testing configuration, it was concluded that the fall protection system 100 can arrest the fall of the user 10 (see FIG. 1) without failing.

It should be noted that although the static tests performed on the fall protection system 100 have been described in detail herein, the above description and testing configurations are equally applicable to the dynamic tests that were performed on the fall protection system 100. However, during the dynamic tests, different specimens of the fall protection system 100 were subjected to a force of up to 2200 pounds. During the dynamic tests, it was observed that the fail protection system 100 can withstand forces of up to 2200 pounds. From the static tests it was concluded that the fall protection system 100 can arrest the fall of the user 10 without failing.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

The invention claimed is:

1. A fall protection system comprising:
   - a lanyard defining a first end, a second end, and a third end, the lanyard comprising:
     - a one-piece webbing comprising a first portion including the first end and a second portion including the second end, wherein the second portion is continuous with the first portion at the third end; and
     - a main connected portion connecting the first portion to the second portion proximal to the third end;
   - a truss extending between the first portion and the second portion and connected to each of the first portion and the second portion, wherein the truss is disposed proximal to the main connected portion, such that the main connected portion is disposed between the third end and the truss;
   - and,
   - an energy absorber connected to the lanyard at the third end of the lanyard;
     - wherein the first portion, the second portion, and the main connected portion, are portions of the one-piece webbing, and wherein the truss is comprised of a separate piece of webbing that is connected to the first portion and the second portion of the one-piece webbing.

2. The fall protection system of claim 1, wherein the first portion and the second portion together form a connecting loop at the third end.

3. The fall protection system of claim 2, wherein the connecting loop is disposed adjacent to the main connected portion and connected to the energy absorber.

4. The fall protection system of claim 3 wherein the connecting loop at the third end of the lanyard is connected to the energy absorber by way of first and second polyester straps so that the connection between the one-piece webbing and the energy absorber does not include any metal components.

5. The fall protection system of claim 1, wherein the energy absorber is configured to deploy in response to a threshold absorber force applied on the energy absorber.

6. The fall protection system of claim 1, wherein the truss comprises:
   - a middle portion partially connected to each of the first portion and the second portion of the one-piece webbing such that a gap is defined between the first and second portions of the one-piece webbing and the middle portion of the truss, wherein the gap is disposed adjacent to the main connected portion of the one-piece webbing;
   - a first end portion extending from the middle portion, wherein the first end portion is connected to the first portion of the lanyard; and
   - a second end portion extending from the middle portion opposite to the first end portion, wherein the second end portion is connected to the second portion of the lanyard.

7. The fall protection system of claim 1, further comprising a first snap hook connected to the first portion of the lanyard at the first end.

8. The fall protection system of claim 7, wherein the first portion comprises a first connected portion forming a first loop at the first end, and wherein the first loop is connected to the first snap hook.

9. The fall protection system of claim 8, wherein the lanyard further comprises a first liner connected to the first connected portion and engaging with the first snap hook.

10. The fall protection system of claim 1, further comprising a second snap hook connected to the second portion of the lanyard at the second end.

11. The fall protection system of claim 1, wherein the main connected portion is stitched to the first portion and the second portion proximal to the third end.

12. The fall protection system of claim 1
    - wherein the energy absorber is configured to deploy in response to a threshold absorber force applied on the energy absorber.

13. The fall protection system of claim 12, wherein, upon deployment of the energy absorber, the fall protection system is configured to provide a free fall distance of greater than 2 feet.

14. The fall protection system of claim 12, wherein the lanyard further comprises a main connected portion connecting the first portion to the second portion, and wherein the main connected portion is disposed between the third end and the truss.

15. The fall protection system of claim 1
    - wherein the truss is configured to maintain a structural integrity of the lanyard proximal to the third end in an event of a fall.

16. The fall protection system of claim 15 wherein the energy absorber is configured to deploy in response to a threshold absorber force applied on the energy absorber.

17. The fall protection system of claim 1 wherein the one-piece webbing that comprises the first portion, the second portion, and the main connected portion, is a single-layer webbing.

18. The fall protection system of claim 1 wherein the separate piece of webbing that provides the truss is connected only to a part of an elongate length of the first portion of the one-piece webbing with the separate piece of webbing not extending along the entirety of the elongate length of the first portion of the one-piece webbing, and wherein the separate piece of webbing that provides the truss is connected only to a part of an elongate length of the second portion of the one piece webbing with the separate piece of webbing not extending along the entirety of the elongate length of the second portion of the one-piece webbing.

19. The fall protection system of claim 1 wherein the fall protection system is configured so that if a force is applied to the first and second ends of the lanyard that is above a threshold force, the truss will break away from at least one of the first and second portions of the one-piece webbing.

20. The fall protection system of claim 19 wherein in the main connected portion of the one-piece webbing, the first portion of the one-piece webbing is connected by stitching to the second portion of the one-piece webbing, proximal to the third end of the lanyard;
    - and, wherein the fall protection system is configured so that if the force is maintained after the truss breaks away from at least one of the first and second portions of the one-piece webbing, the main connected portion of the one-piece webbing will fail so that the first and second portions of the one-piece webbing are no longer connected to each other by the stitching.

* * * * *